Oct. 13, 1931.  J. J. HAYES  1,826,781
FREEZING DEVICE
Filed July 3, 1930
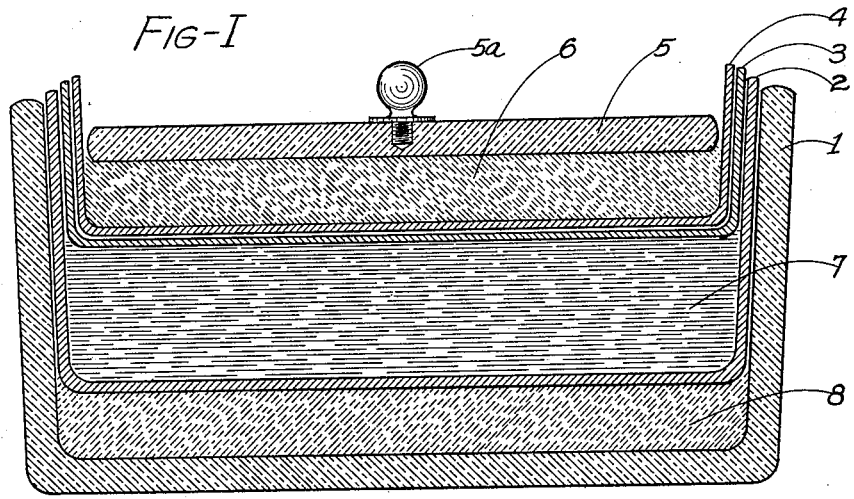
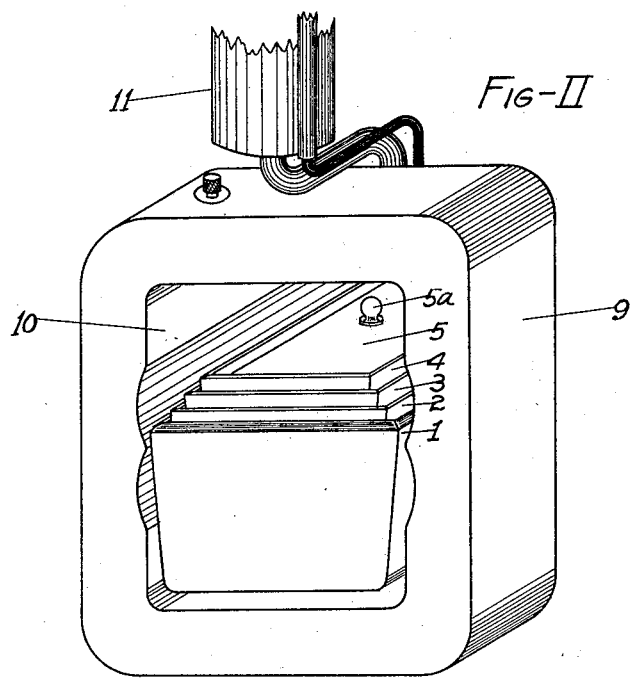
WITNESSES —  James J Hayes  INVENTOR Patented Oct. 13, 1931

1,826,781

UNITED STATES PATENT OFFICE

JAMES J. HAYES, OF LOUISVILLE, KENTUCKY, ASSIGNOR, BY DIRECT AND MESNE ASSIGNMENTS, TO RUTH S. HAYES, OF LOUISVILLE, KENTUCKY

FREEZING DEVICE

Application filed July 3, 1930. Serial No. 465,517.

My invention relates to freezing devices wherein new and useful designs in the construction and combination of parts have been devised and novel ways and means have been discovered in the fabrication and assembling of certain parts adapted for the localization and control of temperature in the process of freezing cream or other food products.

The objects of my invention are (1) to provide a receptacle with flat bottom and outwardly slanting sides, of material impervious to moisture and of low thermal conductivity and of such a design and size as will fit loosely into the lower half of the average cavity of the freezing unit of an ordinary power refrigerator, the receptacle being adapted to hold a predetermined quantity of cracked ice mixed with table salt and to encase completely a telescoping food vessel of predetermined capacity; (2) to provide a food vessel with flat bottom and outwardly slanting sides, of predetermined capacity made of thin material of high thermal conductivity and adapted to slip-fit down into said receptacle, coming down to rest upon said predetermined layer of cracked ice therein; (3) to design two telescoping companion vessels with flat bottoms and outwardly slanting sides, all made of thin material of high thermal conductivity, the outer one being adapted to slip-fit on all sides down into said food vessel, coming to rest upon the predetermined quantity of food therein, and the inner one being adapted to hold a certain quantity of ice chips mixed with table salt and to slip-fit down in the outer vessel, coming to rest upon the bottom thereof; (4) to make a comparatively thick lid of material impervious to moisture and of low thermal conductivity provided with a boss handle and rounded edges, all adapted to slip-fit down into said inner companion vessel, coming to rest full upon the bed of ice chips therein; and (5) to develop an auxiliary freezing device adapted, when properly supplied with freezing compound and food and assembled for its normal functions, to be used in combination with a freezing unit of any refrigerator to facilitate the freezing of the food products therein.

All these objects are attained in the present invention; and the freezing device illustrated in the accompanying drawings which form a part of this specification, is a practicable apparatus embodying the aforesaid novel means and other new and useful details of construction, arrangement and combination of parts, all of which together with their functions will be described in detail with reference to said drawings and will be clearly pointed out in the claims that follow the description.

In said drawings Fig. I is a longitudinal section through the middle of my freezing device and at right-angles to the bottom thereof, as it stands supplied with its normal quantity of freezing compound and food, all parts being assembled for the performance of their normal functions, with the boss handle appearing in elevation.

Fig. II is a front elevation, in perspective, of an ordinary freezing unit of a power refrigerator, including an end elevation, in perspective; of my freezing device adapted, with all parts assembled for functioning normally, to fit into the lower part of the frost chamber of said freezing unit to function as an auxiliary freezing element to increase the food-freezing efficiency of the refrigerator.

This invention has been developed for general use where an auxiliary food-freezing device is desirable for the quick and efficient freezing of food products, in combination with an encasing refrigerator. With this general purpose and these special objects aforesaid in view, I will now describe my invention in detail, pointing out and explaining the uses and the operation of the various parts and combinations thereof throughout my invention, as illustrated in the drawings hereinabove specified, in which similar letters and characters refer to similar parts throughout the several views.

In Fig. I, the numeral 1 represents my receptacle with comparatively thick walls and thick, flat bottom. The sides and ends from the bottom up slant slightly outward. This receptacle is made of bakelite or other suitable material impervious to moisture and of low thermal conductivity to mimimize the transmission of temperature changes between the inside and the outside of this receptacle 1, which is adapted to hold, in operation, a certain quantity of crushed ice mixed with pulverized sodium-chloride, or common salt. This ice-and-salt mixture represented by the numeral 8 is shown in Fig. 1 in its normal quantity and its relative operating position.

The sides of receptacle 1 extend upward far enough to encase practically my food vessel 2, shown in Fig. I nesting down upon the ice-and-salt mixture 8 inside of receptacle 1 and already supplied with its normal quantity of cream 7 or other articles of food to be frozen. My food vessel 2 has a general shape symmetrical with the inside of my receptacle 1 and is made of thin aluminum or other suitable material of high thermal conductivity adapted to make easy the quick interchange of temperatures between the cream 7 inside the food vessel 2 and the comparatively low temperature in the mixture 8 induced by the united dissolution of the ice and salt therein, to ensure the prompt and efficient freezing of the lower half of the cream 7 or other food which may have been placed in vessel 2 to be frozen.

The numerals 3 and 4 represent, respectively, the outer and the inner ones of my two telescoping companion vessels. And the outer vessel 3 has a shape symmetrical with the inner surface of my food vessel 2 and is adapted to slip-fit down into the food vessel and come to rest on the cream 7 or other articles of food therein. And the inner vessel 4 is adapted to make an easy telescoping fit down into its companion vessel 3 and to rest fully on the bottom thereof. And this inner vessel 4 has been designed to hold, leveled out in the bottom thereof, a predetermined quantity of crushed-ice-and-salt mixture 6. Both the outer vessel 3 and the inner vessel 4 are made of thin aluminum or other suitable material of high thermal conductivity adapted to facilitate the quick transmission of temperatures between the cream 7 and the ice-and-salt mixture 6 which the inner vessel holds, so that the upper half of the cream 7 may be promptly and efficiently frozen.

The numeral 5 indicates a thick lid of bakelite or other suitable material impervious to moisture and of low thermal conductivity having a centrally disposed boss handle 5a on its upper side. This lid 5 is provided with rounded edges and is adapted to slip-fit down into the inner vessel 4, coming to rest down on the ice-and-salt mixture 6 therein, being designed to retard the transmission of temperatures between said mixture 6 inside and the atmosphere outside of said lid.

In my new freezing device, the edges of my insulating receptacle and of all other vessels involved, are rounded; and all their interior angles are filleted and the exterior angles are finished in curves adapted to correspond with the filleted interior angles of the average frost chamber of the freezing unit of refrigerators to lessen the air space between the sides of my freezing device and the walls of the frost chamber.

In Fig. II the numeral 9 represents a freezing unit of a power refrigerator, while 10 indicates the frost chamber thereof and 11 represents auxiliary pipes involved in the refrigerating process.

And in this Fig. II my new food-freezing device, with its respective parts indicated by the characters 1, 2, 3, 4, 5 and 5a, all properly assembled for service, having been supplied with their normal quantities of freezing compounds and food elements, is shown in its usual service position inside the frost chamber 10 of the freezing unit 9 of a refrigerator. If larger quantities of cream are used, then larger quantities of freezing compounds would be needed and, consequently, the vessels would stand out higher in the insulating receptacle 1, but there would still be room in the upper part of the frost chamber 10 for such expansion and for ample circulation of air.

Many practical tests of my food-freezing device have demonstrated that various flavors of cream mixed with fully desirable quantities of fruit acids and sugar, can be well frozen in about one-half of the time required for the freezing of ordinary cream in the regular appliances now used in refrigerators.

It will be observed that, for my freezing mixture 6 in the upper part of my freezing device, I am using a frost pan 4 separate from its companion vessel 3 which is in contact with the cream 7. This essential combination I have devised, not to increase the efficiency of the freezing process, but to enhance the convenience of removing the frozen cream. For, experience has demonstrated that, if the upper frost pan 4 is left in direct contact with the cream, they soon become frozen tightly together and can be separated only with inconvenience and delay, whereas by using the telescoping companion vessels we can readily remove the frost pan 4 and, by pouring a little warm water into its companion vessel 3, this vessel also, becomes loose and can be easily lifted out and the cream can then be readily removed.

My freezing device, when properly assembled, supplied with its freezing mixtures and food ingredients and placed in an ordinary ice box, will freeze the cream or other articles of food; but the process requires more time than when the freezing device is used in combination with the refrigerator.

Having thus described the various features of my invention, the construction, operation, arrangement and combination of its parts, what I claim in my invention as new and useful and desire to secure in Letters Patent,

I have set forth specifically in the following claims:—

1. In a freezing device: a flat-bottom, deep receptacle made of moisture-proof material of low thermal conductivity and designed to slip-fit into the lower half of the frost chamber of a refrigerator and adapted to hold a freezing compound and to encase a telescoping food vessel; a food vessel adapted to transmit temperatures readily and designed to hold a certain quantity of cream or other food ingredients, and to slip-fit down into said receptacle and rest upon the freezing compound therein; two telescoping companion vessels adapted to transmit temperatures readily, the outer one of which is designed to slip-fit down into said food vessel far enough to rest upon the cream therein, and the inner one of which is designed to telescope into the outer one far enough to rest fully on the bottom thereof, the inner one being adapted to hold a certain quantity of freezing compound spread-out all over its bottom; and a thick lid with a boss handle, designed to slip-fit down into said inner vessel to rest upon the freezing compound therein, said lid being adapted to retard the transmission of varying temperatures through it, substantially as described.

2. In combination with the freezing unit of a refrigerator; an improved freezing device consisting of a broad, flat-bottom, receptacle having thick bottom and walls of temperature-resisting material adapted to hold a certain quantity of crushed ice and salt and to encase a similarly formed food vessel when resting upon said ice and salt therein; a food vessel adapted to hold cream or other food spread out well over a comparatively broad area; means for applying a confined bed of crushed ice and salt directly all over the top of said cream, and means for readily removing said bed of freezing compound without disturbing said cream; substantially as explained in the foregoing specification.

In testimony whereof I have hereunto set my signature this twenty-eighth day of June, 1930.

JAMES J. HAYES.